(12) United States Patent
Bruce

(10) Patent No.: US 6,215,593 B1
(45) Date of Patent: *Apr. 10, 2001

(54) PORTABLE WIDE-FIELD OPTICAL SYSTEM WITH MICROLENSES AND FIBER-OPTIC IMAGE TRANSFER ELEMENT

(76) Inventor: Ian A. Bruce, 300 Mercer St., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,368
(22) Filed: Nov. 12, 1997

Related U.S. Application Data

(60) Provisional application No. 60/030,000, filed on Nov. 13, 1996.

(51) Int. Cl.[7] .................................................. G02B 27/10
(52) U.S. Cl. .................................... 359/619; 359/626
(58) Field of Search ................................. 359/619, 621, 359/622, 623, 624, 625, 626

(56) References Cited

U.S. PATENT DOCUMENTS

| | | | |
|---|---|---|---|
| 4,076,378 | 2/1978 | Cole | 350/96 |
| 4,414,565 * | 11/1983 | Shanks | 358/89 |
| 4,636,866 | 1/1987 | Hattori | 358/236 |
| 5,034,809 | 7/1991 | Katoh | 358/88 |
| 5,371,556 | 12/1994 | Suwa et al. | 351/158 |
| 5,499,138 | 3/1996 | Iba | 359/569 |
| 5,561,538 | 10/1996 | Kato et al. | 359/40 |

FOREIGN PATENT DOCUMENTS 9722964  6/1997  (WO).

* cited by examiner

*Primary Examiner*—Ricky Mack
(74) *Attorney, Agent, or Firm*—Ladas & Parry

(57) ABSTRACT

An optical system converts a planar image display to a spherical image display focused for close proximity to a human eye, in order to provide a wide viewing field. The optical system includes an array of image source pixels provided by a flat panel display, such as a high resolution liquid crystal display. The image source pixels are received by an array of optical fibers which transfer light from the image source pixels to an image plane section where the optical fibers terminate in a curved surface configuration. The curved surface image projection emanating from the array of optical fibers is received by an array of micro-lenses. Each of the micro-lenses is configured to focus a portion of the light from the curved image plane section onto an eye for viewing the image.

23 Claims, 11 Drawing Sheets

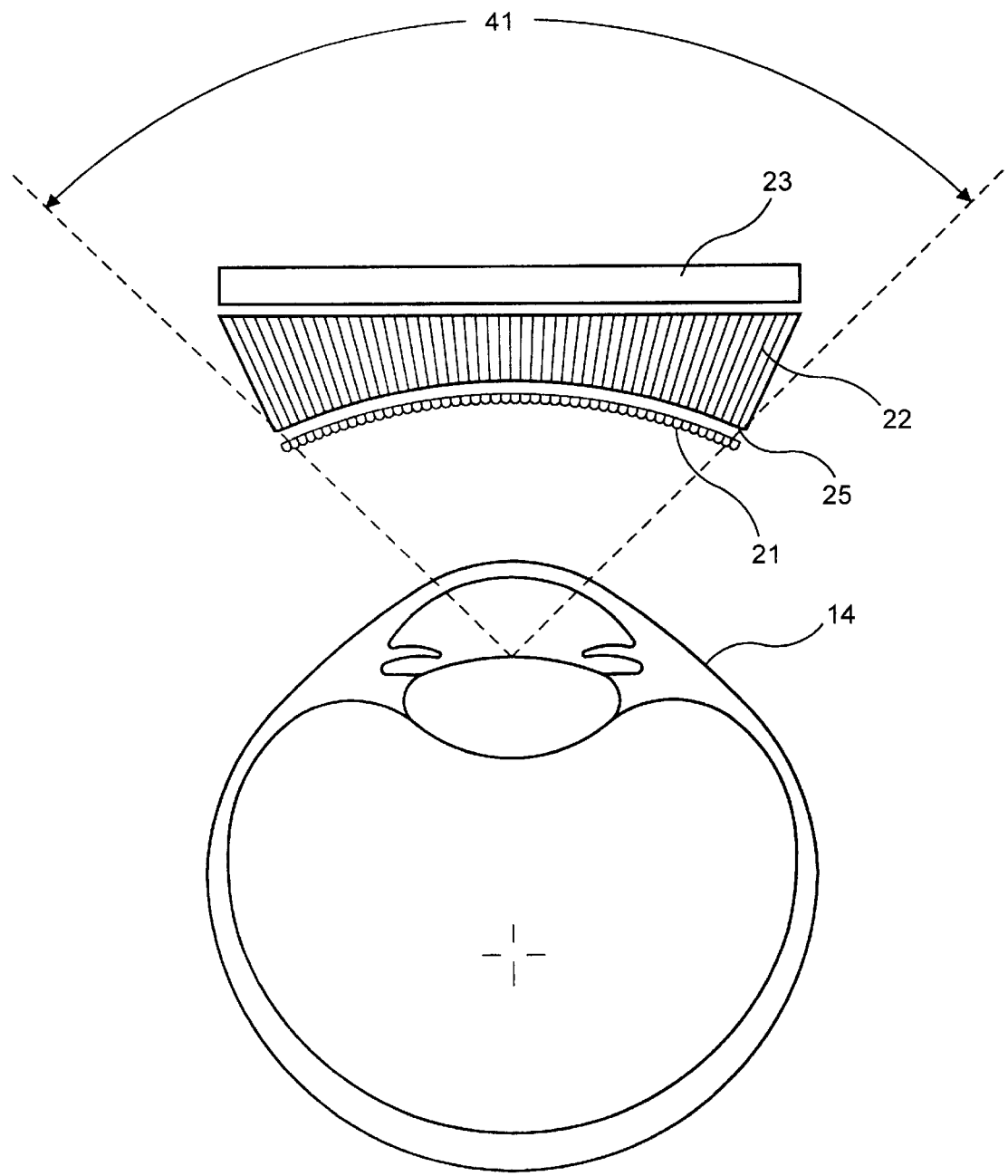
F I G. 2A

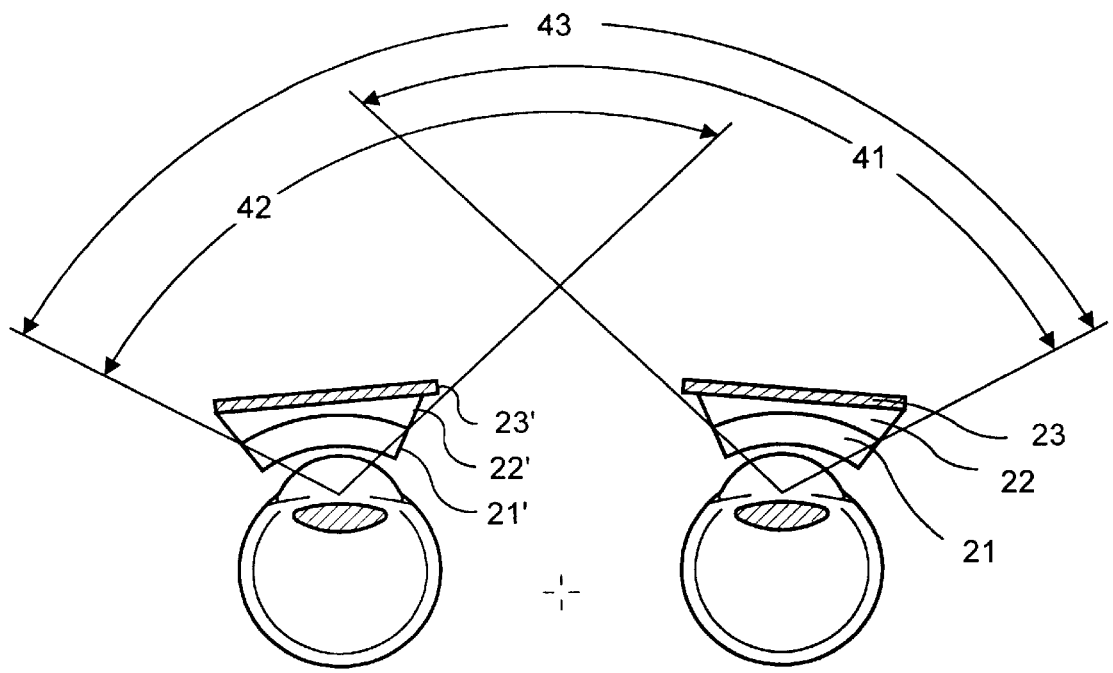
F I G. 4A
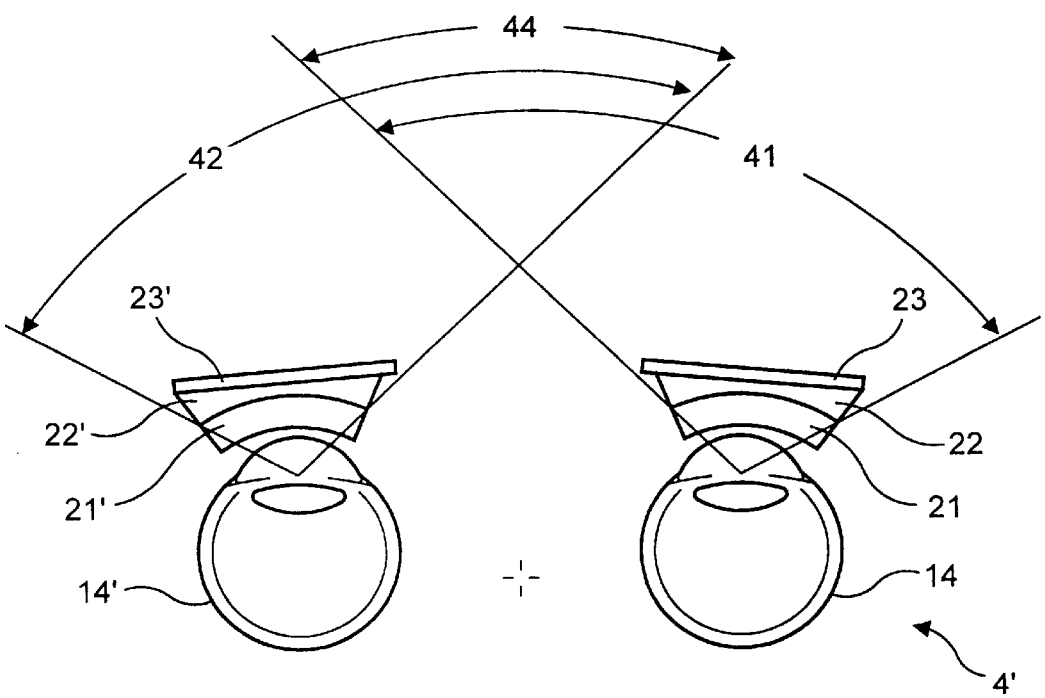
F I G. 4B

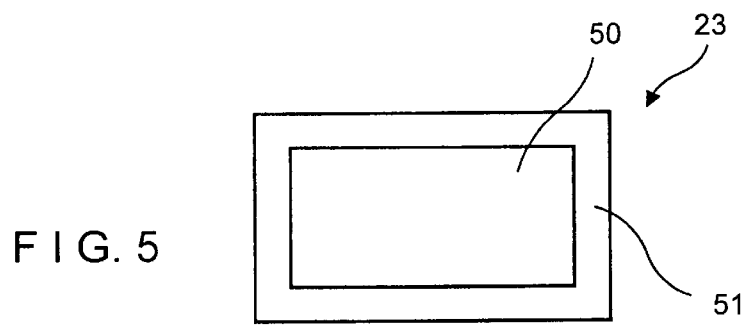
F I G. 5
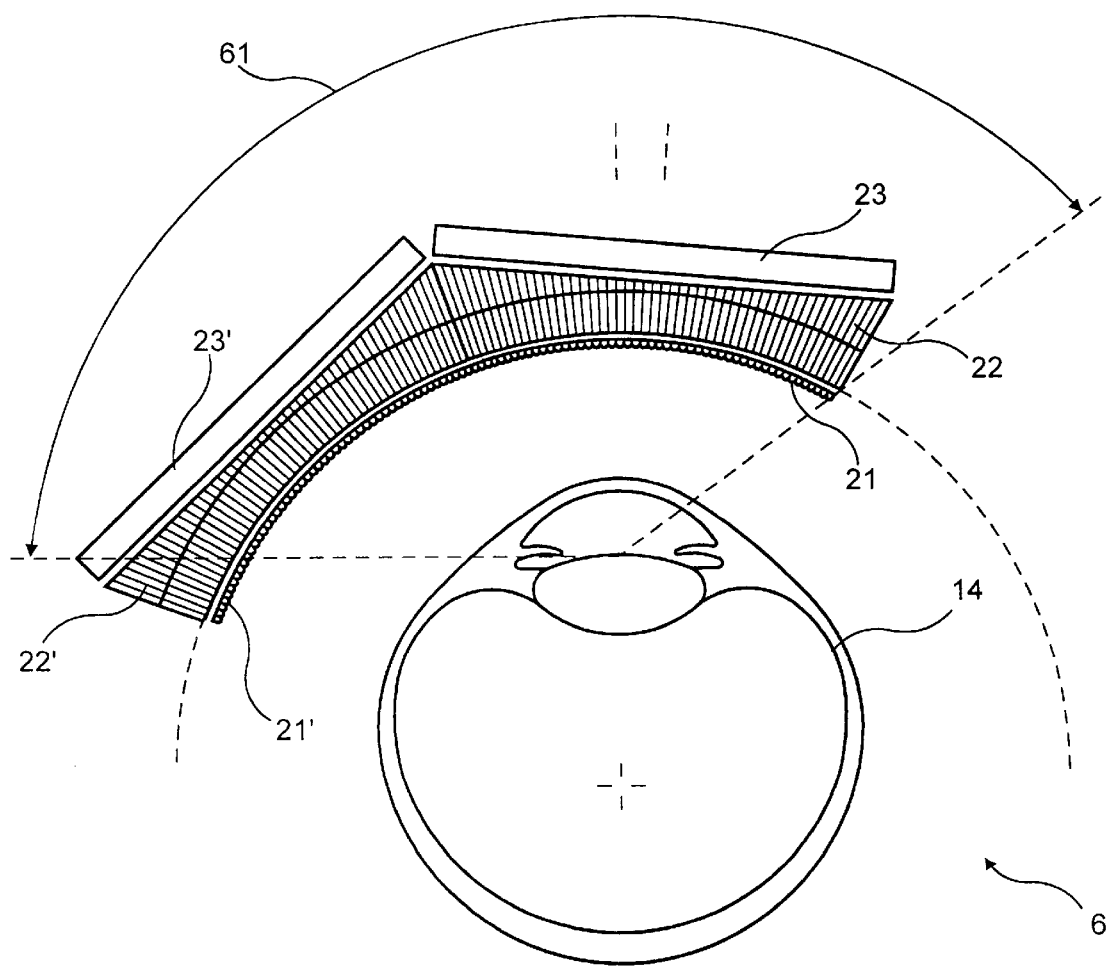
F I G. 6

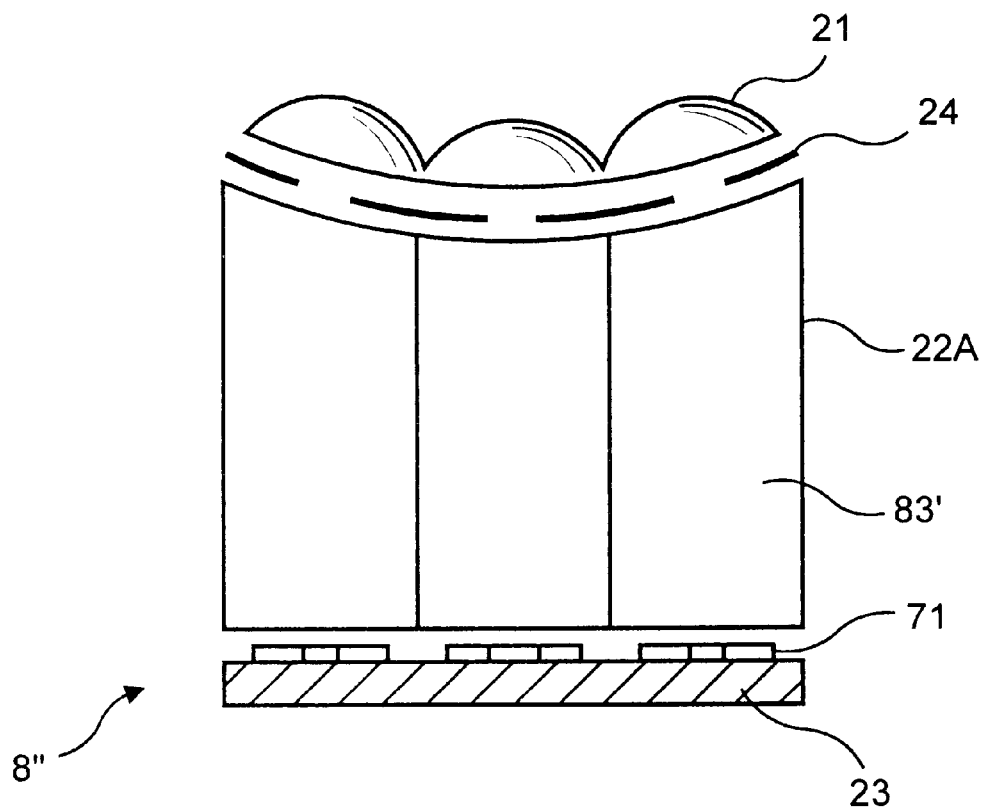
F I G. 8C

PORTABLE WIDE-FIELD OPTICAL SYSTEM WITH MICROLENSES AND FIBER-OPTIC IMAGE TRANSFER ELEMENT

Priority is claimed from provisional patent application No. 60/030,000 filed Nov. 13, 1996.

FIELD OF THE INVENTION

This invention relates to optics and more particularly to an optical system for converting a planar surface display of an image to a curved surface display of the image.

BACKGROUND OF THE INVENTION

A retinal display beams light directly onto a viewing surface of an eye as pixels that form an image. The retinal display produces a brighter, higher resolution image than previous cathode-ray or liquid crystal displays. Head mounted display applications of retinal displays are suitable for consumer virtual reality viewer applications. For a full virtual reality effect, the head mounted display should project onto an undistorted visual field that fills the user's field of view. With a head mounted display, the source display is positioned relatively close to the eye in order for the head mounted display to be compact. However, close proximity to the eye is normally a problem in that the human eye cannot see a very closely positioned image unless it is focused with a lens.

A conventional lens system, as shown by the diagram 1 in FIG. 1, presents a planar display through a right lens 11 to the right eye 14 and through a left lens 11' to the left eye 14'. The traditional single stage optic lenses, 11 and 11', severely limit the horizontal field of views 12 and 13 for each eye to, typically, 30 degrees. As a result, the total viewing field 16 is limited to 30 degrees. As the display size is directly proportional to the angular incidence, it becomes increasingly more difficult for the eye to resolve images which occupy much more than 30 degrees of the visual field 16. Consequently, as shown by the diagram 1 in FIG. 1B, the stereo aperture 15 in relation to the combined left and right viewing fields 12 and 13 is farther out from the retinal surfaces of the eyes 14 and 14'. These single type optical solutions to the problem of wide-field image presentation lead to problems of spherical distortion, chromatic shift, and focus, as the distance to the eye from the center of the image plane increase.

In designing remote vision systems for human operators, two different aspects of human vision should be considered: the high central (foveal) acuity of the eye, and the combined peripheral field of view which accounts for 90% of orientation in three dimensional space. In addition, when creating a commercially viable product of this type, several other engineering factors must be considered including: wearer comfort, versatility and contemporary design.

Accordingly there is a need for an optical system that is capable of converting images from a small electronic source display onto an undistorted visual plane that can fill a viewer's visual field.

SUMMARY OF THE INVENTION

The present optical system includes an image source means for displaying an image on an array of image elements constituting a first image plane, wherein at least one of the image elements provides a light that is different from light, if any, provided by another of the image elements, whereby to display the image. Optical means is provided for transferring the light from at least one of the image elements to a non-planar image surface of the optical means; and lens means for receiving the light from the non-planar image surface of the optical means and focusing the received light with respect to a predetermined viewer. In a preferred embodiment the image source means is a liquid crystal display of high resolution matrix of pixels emitting light to display an image. The optical means is a shaped array of optical fibers, with the optical fiber array being optically coupled to the image elements. The optical fibers are preferably fused together as a single bundle. The lens means is an array of lenses, with each of the lenses being optically coupled to a decreet section of the optical transfer element. In the preferred embodiment, the array of image elements is planar and the array of lenses is convex to the array of image elements.

In an alternative embodiment, the optical system further includes a pair of the image display means, optical means and lens means for respective eyes of a user for stereoscopic display of the image.

In a yet further alternative embodiment, the optical system further includes another of the image display means, optical means and lens means as an accurately displaced chord side by side with the first-mentioned thereof for viewing by a single eye, whereby to expand the field of view for the single eye.

BRIEF DESCRIPTION OF THE DRAWINGS

Merely preferred embodiments of the present invention are described but not limited by reference to the following figures:

FIG. 2A is a schematic sectional plan view of a preferred embodiment of the present optical system positioned near a viewer's eye;

FIG. 4A is a schematic sectional plan view with ray trace lines indicating range of fields each of two eyes confronted by the optical system of FIG. 2;

FIG. 4B is a schematic sectional plan view of the optical system of FIG. 2 with ray trace lines showing stereo aperture in relation to viewing fields presented to a pair of eyes confronted by the optical system of FIG. 2;

FIG. 5 is a schematic of a typical liquid crystal display panel used as an image source display in the present invention;

FIG. 6 is a schematic sectional plan view of two of the optical system of FIG. 2 combined and shown with ray trace lines indicating an increase in total field of view presented to an eye confronted by the pair of optical systems;

FIG. 8C is a schematic diagram showing an alternative optical bundle with non-tapered optic fibers;

DETAILED DESCRIPTION OF PREFERRED EMBODIMENTS

The present optical system in a virtual reality (VR) viewer application will provide nearly 10 times the viewing field of current competitive consumer VR display systems such as Virtual I/O, Forte, and Philips Electronics. All of these systems mentioned attempt to create a single optical solution to the problem of wide-field image presentation, ultimately succumbing to the problems of spherical distortion, chromatic shift, and focus, as the distance from the center of the image plane increases. One answer is to solve the optical problem pixel by pixel, over the entire viewing field. The resultant wide-field image presentation essentially replicates the "real-world" visual environment for each eye. This will make the level of sensory immersion delivered by the viewer unmatched by all but high-end military and industrial virtual reality systems.

As described in detail below, with the present optical system a source image, derived from a computer generated source, video source, etc., is transferred from a planer LCD display surface through a coupled fiber-optic transfer element to a concave image plane. The light then passes through a surface-mounted lenslet array and emerges as a re-collimated focused image. The distance between the cornea and lens surface will be optimized for foveal viewing. Although peripheral imagery must travel a greater distance to the corneal surface, the possible loss of optimum focus should not be great concern as the eye's natural ability to resolve detail becomes increasingly limited as distance from the foveal area increases. Using the identical optical elements and readily available LCD arrays, it is possible to assemble low cost displays that are greater than 180° horizontal×90° vertical, at stereoscopic resolutions approaching 3000 pixels over the horizontal field.

Figure 2B:
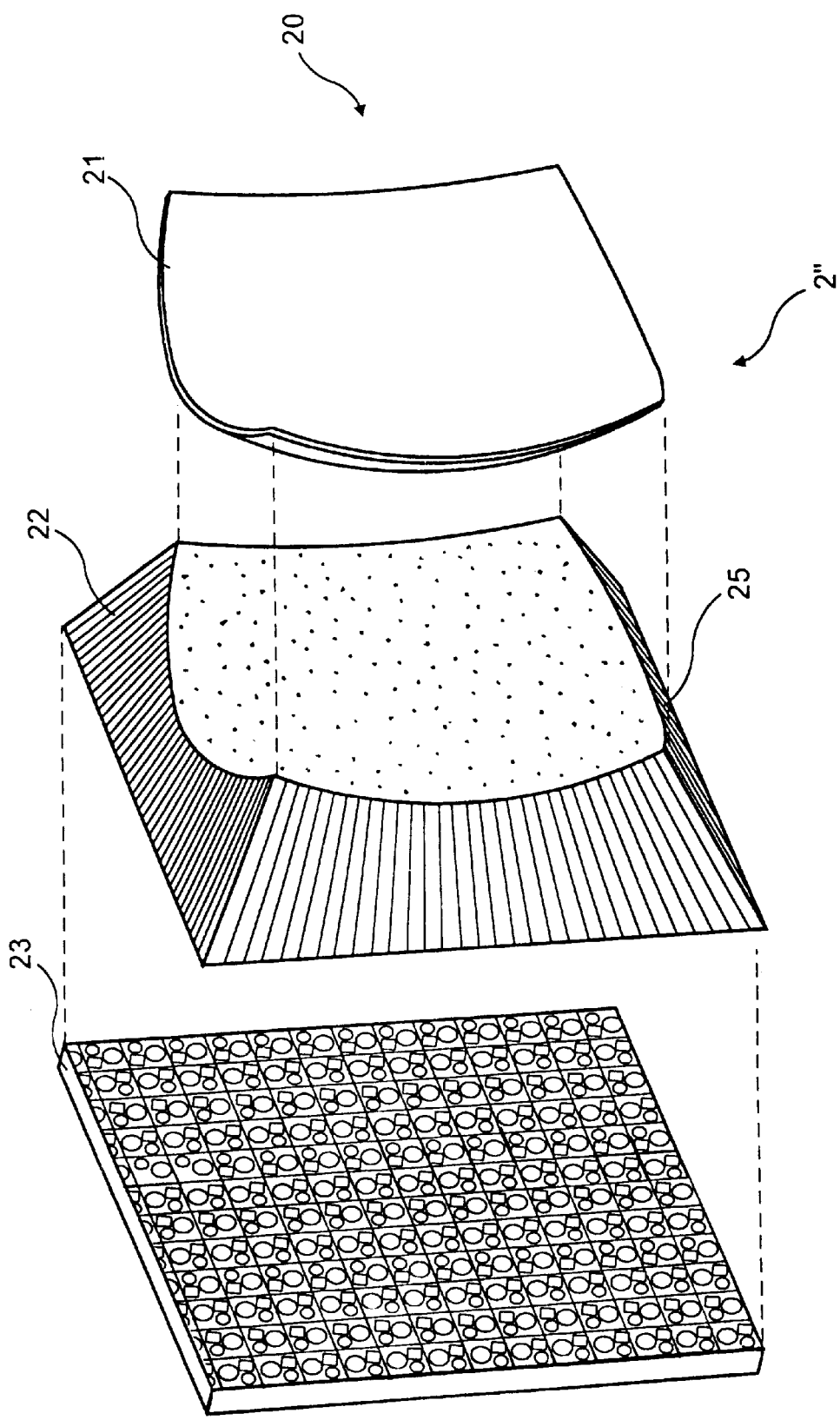
FIG. 2B is an exploded schematic perspective view of components of the optical system of FIG. 2.

Referring now to view 2 of FIG. 2A and view 2' of FIG. 2B, the preferred embodiment of the optical system 20 includes an assembly of an electronic source display 23, and optic transfer element 22, and a micro-lens array 21. The electronic source display 23 provides a planar image, that is transferred through the optically coupled fiber optic transfer element 22 to a concave image plane 25 of the fiber optic transfer element 22. Light from the concave image plane 25 then passes through micro-lens array 21 mounted on a curved surface, and emerges as a re-collimated image that is focused with respect to the retinal surface of a viewing eye 14. The individual lenses of the micro-lens array 21 are arranged on a surface section resembling a surface section of a sphere or a curved surface section that is concave with respect to the eye 14. The individual lenses are positioned in such a way as to focus the light from the optical fibers at an angle perpendicular to the surface of the eye 14, preferably at a distance of approximately 0.25 to 0.5 inches.

For head mounted displays that are compact and portable, the electronic source display 23 is preferably no greater than 1.5 inches to 2 inches. The most appropriate source displays are high resolution, active matrix liquid crystal displays (LCD). The preferred LCD source display 23, for each eye 14, is composed of approximately 350,000 points of resolution. Liquid crystal displays typically require backlighting (not shown) which can be provided by the end use equipment in which the present optical system is utilized.

Figure 3:
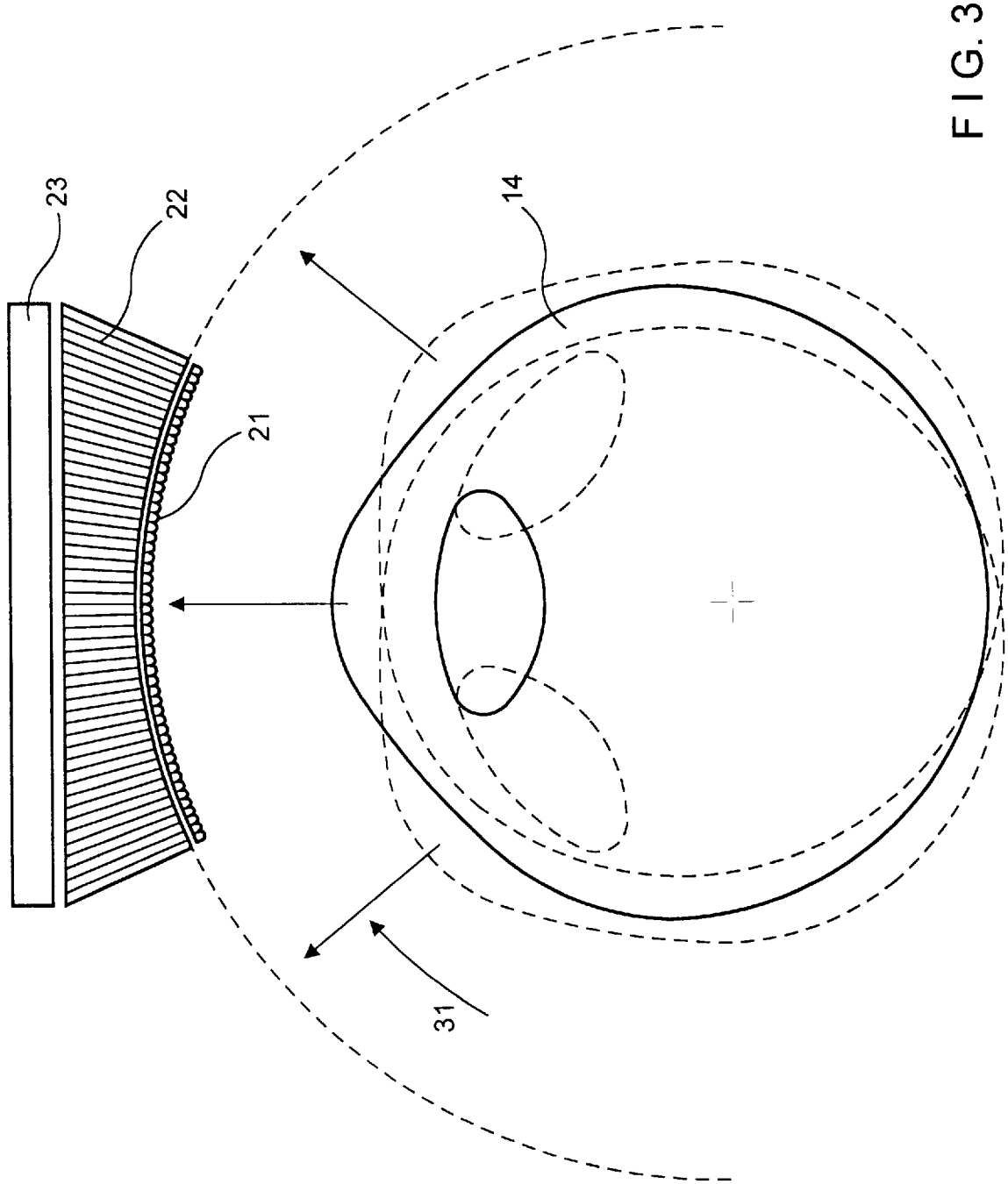
FIG. 3 is a schematic sectional plan view showing the equidistant relationship between a lens array of the optical system of FIG. 2 and ray trace lines indicating the limit of visual field.

The present optical system 20 is based upon a process that divides and focuses an image from the source display 23. The size and weight of the optical system 20 is reduced through the use of an array of micro-lenses 21. The optical system focuses the individual pixels of the display 23 independently onto the eye 14. The light from each pixel in the display 23 is transferred through a discrete path in the optically coupled fiber-optic transfer element 22, to a corresponding individual lens in the micro-lens array 21. The image plane of the micro-lens array 21, as shown by the view 3 in FIG. 3, always maintains the same distance 31 from the curved surface of the eye 14.

The fiber optic transfer element 22 is a fused array of minute, individually clad optical fibers, capable of transferring an image formed at one surface of the transfer element 22 to another optical plane 25 with high resolution and efficiency, and very low distortion. This capability makes the fiber optic faceplate 22 the optical equivalent of a "zero thickness" screen or window. The geometry of the fiber optic transfer element 22 also does away with the need for polynomial image recalculation that is typical in other wide-field optical systems. The individual lenses of the micro-lens array 21 are arranged to match the geometry of the source display 23 as a single, very thin optical array.

The fiber optic element 22 and the micro-lens array 21 cooperate to correctly focus each pixel from the source display 23 onto the eye 14. The light transmitting surface of the optical system 20, in particular the light emitting surface of the micro-lens array 21, is shaped as a spherical section in order to emulate the visual impression received in normal human vision. As shown by the schematic 4 in FIG. 4A and the schematic 4' in FIG. 4B, each of the right and left eyes 14 and 14' receives an impression from an independent optical system 21, 22, 23 and 21', 22', 23', respectively. When combined, the right and left field of views 41 and 42 give the viewer a high-resolution, stereoscopic image 44, over a wide viewing field that is nearly 10 times the size of a viewing field from a conventional lens system presenting a planar display to the eye.

The present optical system 20 offers a reduction in weight and size, while maintaining a wide viewing field, that is unattainable by known optical systems. There are two possible ways to create a visual image that fills the viewer's field of view. One way is to present a large image over a wide viewing field, such as a large projection screen. Another way is to take a small image and focus on the eye. In the case of a small image, if a single lens is used, the lens must be much larger than the source image in order for the visual impression to be optically correct. This requirement of a larger image yields unsatisfactory results with respect to visual impression on the human eye.

The present optical system 20 utilizes multiple lenses in the micro-lens array 21, which permits the size and weight of the array 21 to be reduced in proportion to the number of lenses that are used. In other words, to cover a given angular viewing field as seen by the eye 14 requires a lens whose diameter is roughly that angle times the distance from the pupil, $D=r\theta^3$. The volume of this lens is then approximately $D^3$ or $r^3\theta$. If instead, the optic lens is divided into an N by N array of smaller lenses, each of the smaller lenses has only to cover an angle of $\theta/N$, leading to a diameter of $r\theta/N$. Each of these smaller lenses has a volume of $r^3\theta^3/N$. There are, however, $N^2$ of the smaller lenses, making the total volume of the lens array $r^3\theta^3/N$, a reduction in-volume by a factor of N. The true reduction in volume may exceed the factor of N, because each lens in the array needs to cover 1/N of the viewing field angle of the lens array. Consequently, a much simpler lens design can be used, which leads to a reduction in the volume of the optic system.

Figure 1B:
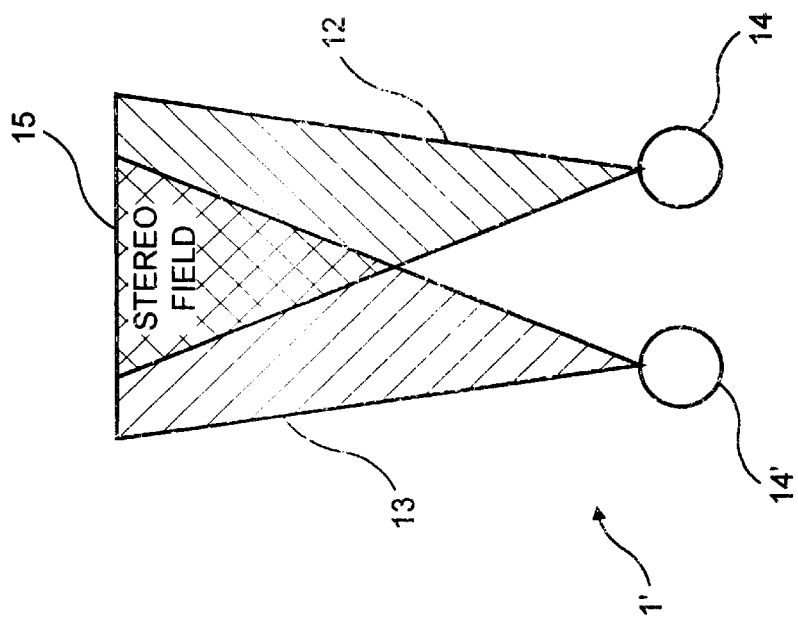
FIG. 1B is a schematic plan view showing stereo aperture in relation to left and right viewing field each eye with the conventional retinal display of FIG. 1A.
Figure 1A:
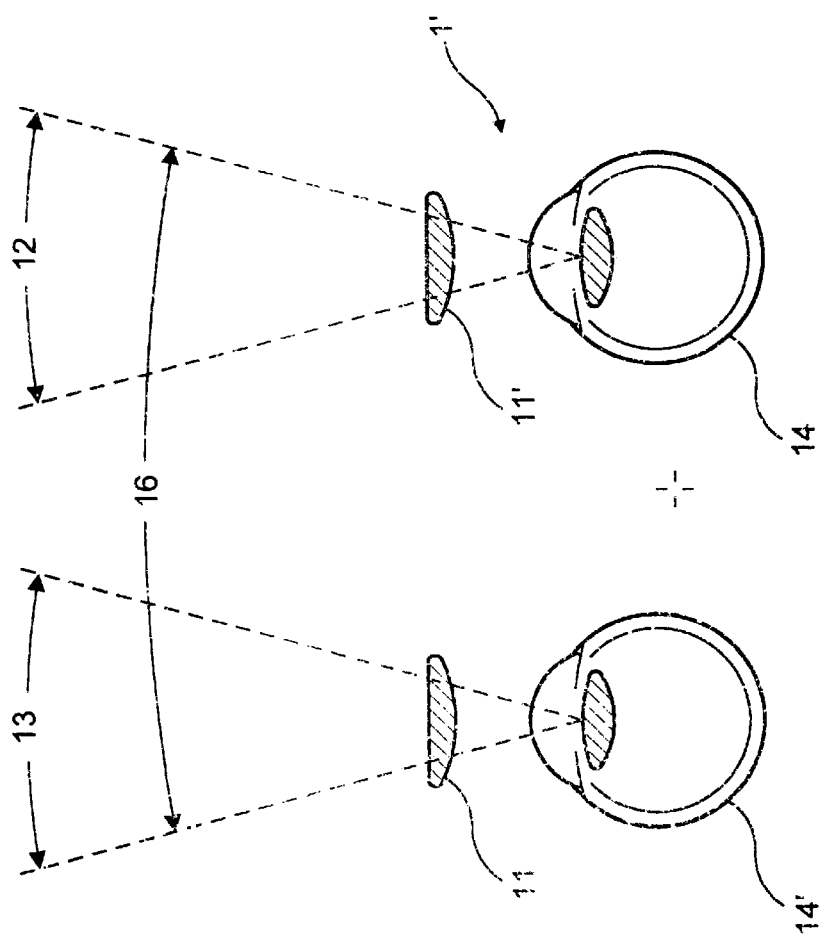
FIG. 1A is a schematic sectional plan view of a conventional retinal display that is shown with viewing eyes and limits of viewing field for each eye.

The individual and total viewing fields provided to a user by the present optical system 2 is greater than that for a convention al optical system providing a planar display. For the present optical system 20, referring again to the schematic 4 of FIG. 4A, the right eye 14 receives an image impression emanating from a first micro-lens array 21 of the optical system 20 (not shown) at a viewing field of 105 degrees 41. The left eye 14' receives an image impression from a another micro-lens array 21' of an optical system, which is a duplicate of the optical system including array 21, at a viewing field of 105 degrees 42. The total viewing field 23 resulting from the combination of the two viewing fields 41 and 42 is 120 degrees. Referring again to the schematic 4' of FIG. 4B, the stereo aperture 44 in relation to the viewing fields 41 and 42 is greater than that of the conventional planar display, as shown in FIG. 1B. By utilizing borderless (or thin border) image source displays, multiples of the present optical system 20 can be combined to increase the overall viewing field. In particular, duplicates of the optical system 20, with borderless (or thin border) source displays, can be combined as a 1-dimensional horizontal array, 1-dimensional vertical array, or 2-dimensional horizontal and vertical array, in order to increase the overall viewing field. The source display 23, as shown in FIG. 5, is typically manufactured with a border 51 surrounding an image matrix 50. If the source display 23 is configured with a thin border or without a border 51, then multiple source displays can be butted next to each other without any noticeable distortion in the overall image including the transitions between the multiple source displays 23. Borderless source displays permit multiples of the optical system 20 to be combined in an arcuate pattern, so that the micro lens array of each optical system 20 maintains the same equidistant relationship to the curved surface of the eye 14. The resulting combined image matrix 50 of all the optical systems 2 extends from end-to-end in both directions. As shown by the schematic 6 of FIG. 6, a second optical assembly of source display 23', fiber optic bundle 22', and micro-lens array 21' abuts the duplicate optic assembly 23, 22, 21. The spherical or curved surface image section of the second optic assembly 23', 22', 21' is oriented to continue the spherical or curved surface image section of the first optic assembly 23, 22, 21.

As a further embodiment, three optic systems 2 can be combined horizontally by adding a third optic system 20 (not shown) to the right of the combination shown in FIG. 6, to provide a total horizontal viewing field of 180 degrees. Likewise, the total vertical viewing field can be increased by combining multiples of the present optical system 2 in the vertical direction with respect to the horizontal viewing plane shown in FIG. 6.

Figure 7:
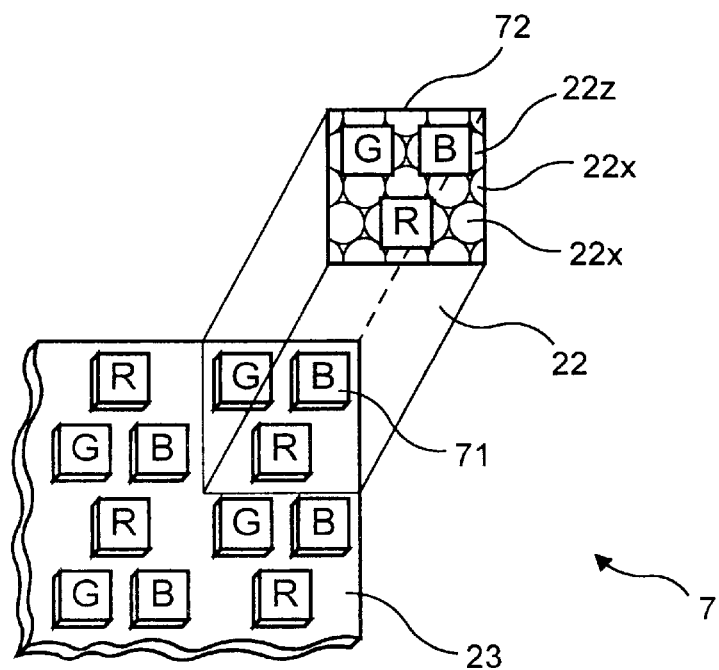
FIG. 7 is a schematic planar and partial perspective view showing red, green and blue pixel components in a single image element of an image source display for use with the optical system of FIG. 2.

Referring now to FIG. 7, the schematic view 7 shows that each of the image or pixel elements of the image source display 23 is a triad 71 of red (R), green (G) and blue (B) colored pixels which emit light as a combination to provide a color. Each light emission from a particular triad combination of R, G and B pixel elements is transferred through a number of the optical fibers 22x, 22y, 22z (remaining optic fibers in the cube section 72 have not been referenced for sake of clarity), shown for only one triad 71 for sake of clarity.

Figure 8A:
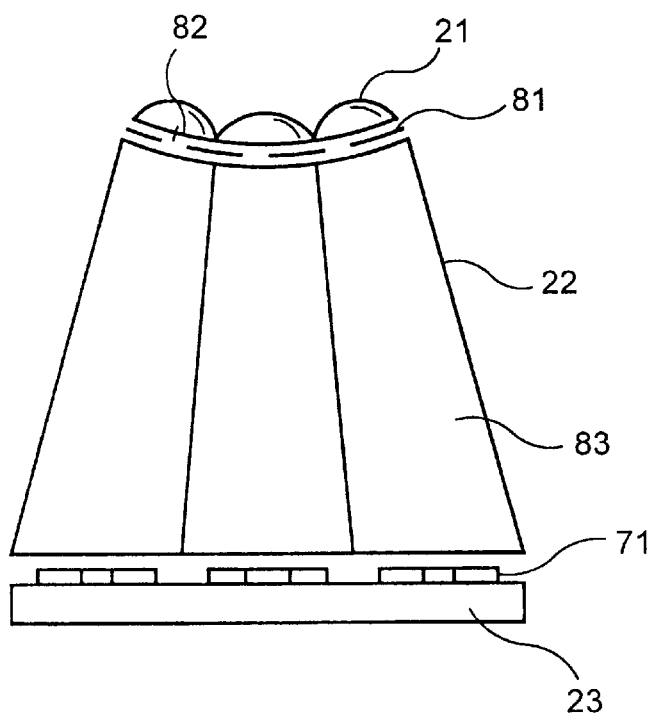
FIG. 8A is a schematic partial sectional view detailing a masking feature over an optical bundle of tapered optic fibers in the optical system of FIG. 2.
Figure 8B:
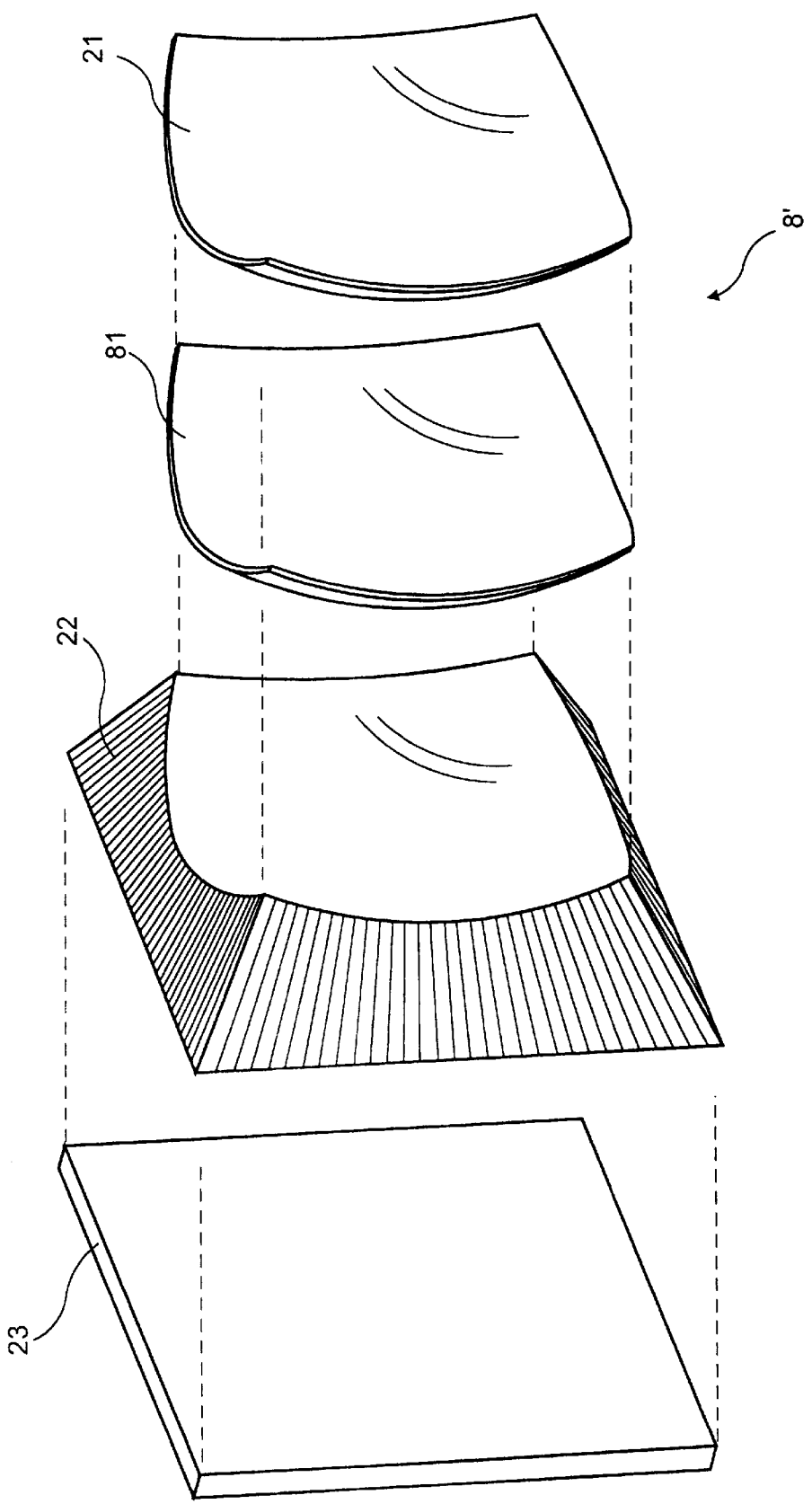
FIG. 8B is an exploded schematic perspective view of the optical system shown in FIG. 8A.

In an alternative embodiment of the present optical system, as shown by the schematic 8 of FIG. 8A and the schematic 8' of FIG. 8B, a shadow mask 81 with apertures 82 is interposed between the emission end of a distinct one of the fibers in the optical fiber bundle 22 and a distinct one of the lenses in the micro-lens array 21. Each of the apertures 82 is preferably aligned with a distinct triad grouping of R, G and B pixel elements so as to provide an overall seamless and continuous tone image presented to a viewer's eye. The schematic 8 shows that the cross sectional area of the fiber optic array 83 is tapered from a first cross sectional area at the end receiving light from a triad grouping 71 to a second cross sectional area, smaller than the first cross sectional area, from which colored light from the triad is emitted through one of the apertures of the shadow mask 81 onto a lens in the micro-lens array 21. The effect of the reduction in cross sectional area in the fiber optic pathway 83 is that the light component traveling in the fiber optic 83 is condensed and the resultant light emitted to the lens in the lens array 21 is brighter than when that light component first entered the fiber optic 83. As a result, the lens array 21 collectively receives a brighter image from the optic bundle 22, and the brighter image is focused onto the viewer's eye.

Figure 8D:
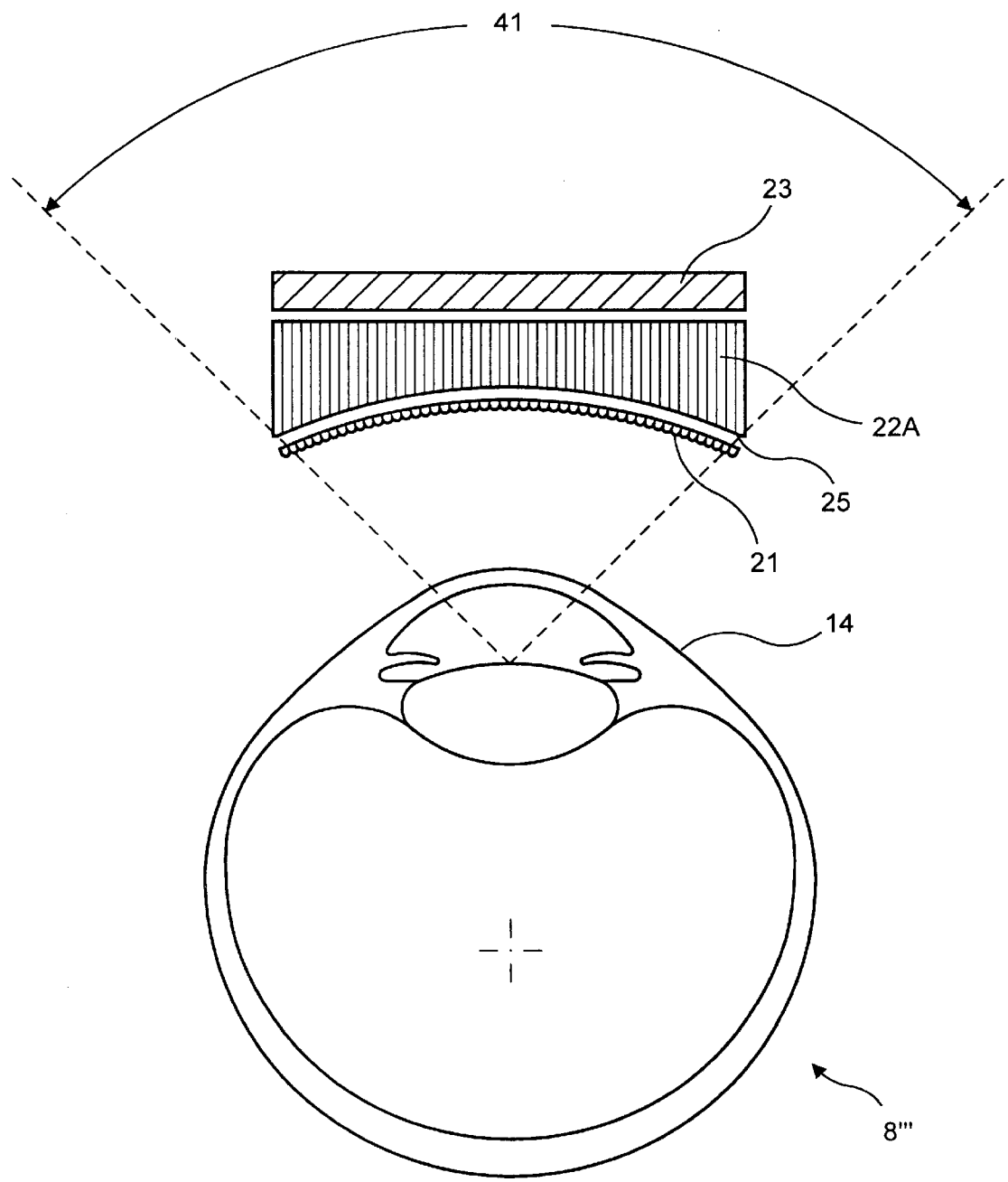
FIG. 8D is a schematic diagram showing an alternative optical system employing the non-tapered optic fibers of FIG. 8C.

As an alternative to the tapered configuration of the optic fiber bundle discussed above, the optic fiber bundle 22A can have a uniform cross section as shown by the schematic 8" of FIG. 8C and the schematic 8"' of FIG. 8D. The fiber optic bundle 22A includes individual optic fibers 83' that each have a uniform cross sectional area in the light pathway, so that the overall width of the transmitting surface 25 is the same as the planar input side of the optic bundle. As shown in FIG. 8D, the arcuate width of micro-lens array is extended out to match the arcuate width of the transmitting surface 25 of the optic bundle 22A.

Figure 9:
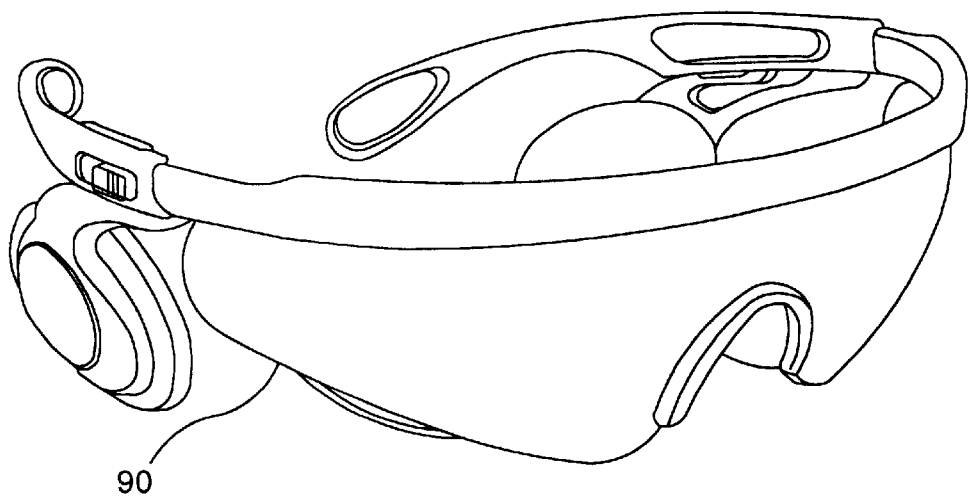
FIG. 9 is a schematic perspective view of a possible head mounted display configuration employing the optical system of FIG. 2.
Figure 10:
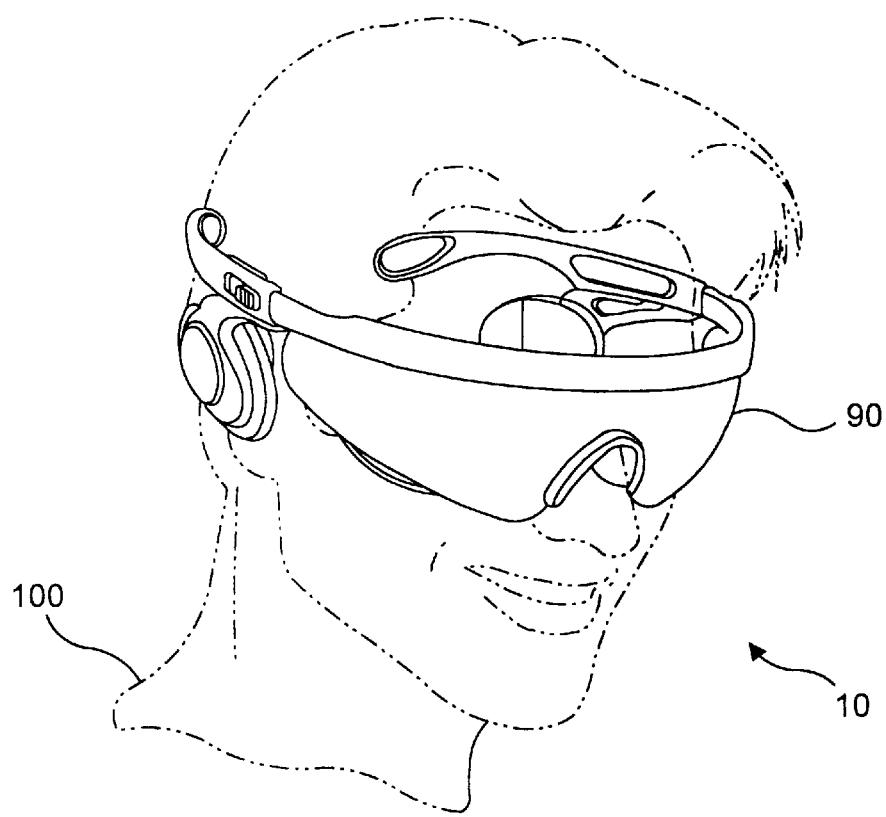
FIG. 10 is a schematic perspective view showing the head mounted display of FIG. 9 worn on a user's head.

The present optical system 20 is suitable for use in a virtual reality (VR) viewer in the form of a head mounted display 90, shown in a possible configuration by the schematic perspective view 9 of FIG. 9. The head mounted display 90 is shown worn by a user 100, in the schematic perspective view 10 of FIG. 10. A VR viewer, employing the present optical system, can be designed as a high-resolution, wide field-of-view personal display system (PDS) for immersive experiences, virtual reality, entertainment, and business applications. The PDS can combine wide-field stereo video and spatial audio in a simple, light-weight configuration no larger than a pair of sports sunglasses. The components of the head mounted display 90 would preferably include two independently addressable high-resolution displays 23 (active-matrix LCD (AMLCD) and others), control integrated circuits (ICs), 2 shaped 6 to 8 micron glass-on-glass fiber-optic elements 22, and 2 proprietary micro-optical lens arrays 21 coupled to the transfer surface plane. The configuration and operation of the control ICs (not shown) are well known and understood by those of ordinary skill in the art and need not be discussed in detail herein.

The disclosures of the following publications are incorporated herein by reference: PCT application WO/9722964 published Jun. 26, 1997; U.S. Pat. No. 5,561,538 issued to Kato et al. and granted on Oct. 1, 1996; U.S. Pat. No. 4,076,378 issued to Cole and granted on Feb. 28, 1978; U.S. Pat. No. 5,034,809 issued to Katoh and granted Jul. 23, 1991; U.S. Pat. No. 5,371,556 issued to Suwa at al. and granted on Dec. 6, 1994; U.S. Pat. No. 4,636,866 issued to Hattori and granted on Jan. 13, 1987; and U.S. Pat. No. 5,499,138 issued to Iba and granted on Mar. 12, 1996.

Variations, combinations and permutations of the above as would occur to those of ordinary skill in the art are included in the scope and spirit of the present invention. For example, although the present optical system has been described in the context of a virtual reality viewer application, other applications include but are not limited to: immersive personal computer (PC) displays; "virtual desktop" pocket computers and personal information devices; "virtual tele-conferencing"; DVD video "Walkman"; VR cable systems; VR-DVC camcorders; dedicated video game systems, and many others.

What is claimed is:

1. An optical system comprising:

image source means for displaying an image on an array of image elements constituting a first image plane, wherein at least one of said elements provides a light that is different from light that would be provided by another of said image elements, whereby to display said image;

optical means for transferring said light from at least one of said image elements to a non-planar image surface of said optical means; and lens means for receiving said light from said non-planar image surface of said optical means and focusing the received said light with respect to a predetermined viewer.

2. The optical system according to claim 1, wherein said optical means comprises an array of optical transfer elements, each of said optical transfer elements being optically coupled to at least one of said image elements.

3. The optical system according to claim 2, wherein said lens means comprises an array of lenses, each of said lenses being optically coupled to a different section of said optical transfer element.

4. The optical system according to claim 3, wherein said array of image elements is planar and said array of lenses is convex to the array of image elements.

5. The optical system according to claim 4, wherein said optical means is congruent to said arrays of image elements and lenses.

6. The optical system according to claim 1, wherein said optical means comprises an array of optical fibers, each of said optical fibers being optically coupled to at least one of said image elements.

7. The optical system according to claim 6, wherein said array of optical fibers is fused.

8. The optical system according to claim 1, further comprising a pair of said image display means, optical means and lens means for respective eyes of a user for stereoscopic display of said image.

9. The optical system according to claim 1, further comprising another of said image display means, optical means and lens means as an accurately displaced chord side by side with the first-mentioned thereof for viewing by a single eye, whereby to expand the field of view for the single eye.

10. The optical system according to claim 1, further comprising a mask interposed between said optical means and said lens means, said mask having apertures, each of said apertures being substantially aligned between distinct single corresponding elements of said image means and said lens means.

11. An optical system, comprising:

image display means for displaying an image as a planar array of points of light;

optical means for receiving said planar array of points of light and emitting the received said planar array of points of light as a non-planar array of said points of light; and lens means for receiving said non-planar array of said points of light and focusing said non-planar array of points of light with respect to a viewing source.

12. The optical system according to claim 11, wherein the image display means is planar, the lens means is convex thereto, and the optical means is complementary to said image display means and lens means.

13. The optical system according to claim 11, wherein a surface of the lens means presented to an eye comprises a curved surface for emulating a visual impression of normal vision.

14. The optical system according to claim 11, wherein said optical means is an array of optical fibers which are fused, each of said points of lights being received into at least one of said optical fibers.

15. The optical system according to claim 14, wherein said optical fibers are fused.

16. The optical system according to claim 11, further comprising another image display means, optical means and lens means for another eye, whereby to provide a stereoscopic display.

17. The optical system according to claim 11, further comprising a mask interposed between said optical means and said lens means, said mask having apertures, each of said apertures being substantially aligned between distinct single corresponding elements of said image means and said lens means.

18. The optical system according to claim 11, further comprising another image display means, optic means, and lens means as an accurately displaced chord side by side with the first-mentioned thereof for viewing by a single eye, whereby to expand the field of view for said single eye.

19. An optical system comprising:

an array of image source pixels for providing light at a first image surface;

an array of optical transfer elements, each one of said optical transfer elements being optically coupled to a different one of said image source pixels and emitting said light at a second image surface shaped differently from said first image surface; and an array of lenses, each one of said lenses being optically coupled to a different one of light emitting ends of said optical transfer elements, each one of said lenses having a predetermined focal length for emitting said light.

20. The optical system according to claim 19, wherein said optical transfer elements are optical fibers.

21. The optical system according to claim 19, further comprising another said array of image source pixels, array of optical transfer elements and array of lenses for another eye, whereby to provide a stereoscopic display.

22. The optical system according to claim 19, further comprising another said array of image source pixels, array of optical transfer elements and array of lenses as an accurately displaced chord side by side with the first-mentioned thereof for viewing by a single eye, whereby to expand the field of view for said single eye.

23. The optical system according to claim 19, further comprising further comprising a mask interposed between said array of optical transfer elements and said array of lenses, said mask having apertures, each of said apertures being substantially aligned between distinct one of said optical transfer elements and a distinct one of said lenses.

* * * * *